ically, Sakashita et al.

United States Patent [19]

Sakashita et al.

[11] Patent Number: 5,514,767
[45] Date of Patent: May 7, 1996

[54] HOT-MELT POLYCONDENSATION METHOD FOR MANUFACTURING A POLYCARBONATE COMPOSITION

[75] Inventors: Takeshi Sakashita, Moka; Tomoaki Shimoda, Iwakuni; Takashi Nagai, Moka; Kenichi Tominari, Narashino; Akio Kanezawa, Sodegaura, all of Japan

[73] Assignee: General Electric Company, Pittsfield, Mass.

[21] Appl. No.: 281,965

[22] Filed: Jul. 28, 1994

[30] Foreign Application Priority Data

Jul. 30, 1993 [JP] Japan ................................. 5-189550

[51] Int. Cl.$^6$ ................................................ C08G 64/00
[52] U.S. Cl. ........................... 528/198; 524/367; 524/378; 525/461; 525/463; 528/196
[58] Field of Search ..................... 528/196, 198; 525/461, 463; 524/367, 378

[56] References Cited

FOREIGN PATENT DOCUMENTS

| 0435124 | 7/1991 | European Pat. Off. . |
|---|---|---|
| 4103626 | 4/1992 | Japan . |
| 4175368 | 6/1992 | Japan . |
| 4328124 | 11/1992 | Japan . |

*Primary Examiner*—James J. Seidleck
*Assistant Examiner*—Terressa Mosley

[57] ABSTRACT

The method of the present invention is a hot-melt polycondensation for an aromatic dihydroxy compound and a dicarbonate in the presence of a basic catalyst, adding sulfur-containing acid compound with a pKa value less than 3 or the derivative thereof, and 5–1,000 ppm of water, and additives as needed for the polycarbonate while the reaction product polycarbonate is still in a molten state, and kneading the material.

9 Claims, No Drawings

HOT-MELT POLYCONDENSATION METHOD FOR MANUFACTURING A POLYCARBONATE COMPOSITION

The present invention provides a method for manufacturing a polycarbonate composition that is capable of efficiently producing a polycarbonate composition with a superior stability such as heat stability and color stability at the time of the molding process as well as high weather resistance, moisture resistance and transparency.

TECHNICAL FIELD OF THE INVENTION

The present invention pertains to a method for manufacturing a polycarbonate composition, more precisely, it pertains to a method for manufacturing a polycarbonate composition that is capable of producing a polycarbonate composition with good endurance properties such as heat stability, and color stability as well as high weather resistance and moisture resistance.

TECHNICAL BACKGROUND OF THE INVENTION

Polycarbonate has superior mechanical properties such as impact resistance, high heat resistance and transparency, and is widely used for applications such as various types of machine parts, optical discs, automobile parts, etc.

In the past, the above mentioned polycarbonate has been produced using a method consisting of a direct reaction of an aromatic dihydroxy compound such as bisphenol and phosgene (interfacial method), or a method consisting of a transesterification reaction of an aromatic dihydroxy compound and a dicarbonate (hot-melt method).

Among those described above, the hot-melt method (hot-melt polycondensation) has an advantage over the interfacial method since it is possible to produce a polycarbonate at a relatively low cost; furthermore, toxic materials such as phosgene are not used; therefore, it is desirable from the environmental standpoint as well.

Incidentally, in conventional polycarbonates, the stability becomes inferior in some cases at the time of hot-melt processes such as molding, and a part of the material decomposes; as a result, problems such as a decrease in the molecular weight and discoloration occur at times.

As a method to improve the stability of the polycarbonate, in the past, a method consisting of adding an additive suitable for the application purpose after performing a polycondensation for an aromatic dihydroxy compound, and a dicarbonate in the presence of an alkaline catalyst compound while the polycarbonate reaction product is still in a molten state in the hot-melt polycondensation method, and kneading the material to reduce the occurrence of the heat history that the polycarbonate is subjected to during manufacturing (Japanese Kokai Patent Application No. Hei 4[1992]-103626), and a method consisting of adding an acid compound after performing a hot-melt polycondensation of an aromatic dihydroxy compound and a dicarbonate in the presence of an alkaline catalyst compound (Japanese Kokai Patent Application No. Hei 4[1992]-175368, and Japanese Kokai Patent Application No. Hei 4[1992]-328124) are disclosed.

As a result of continued research into manufacturing methods of polycarbonates using the hot-melt polycondensation method, the inventors discovered that a polycarbonate composition with further improved stability, for example heat stability and color stability at the time of molding and high weather resistance and moisture resistance, can be produced when a sulfur-containing compound with a pKa value less than 3 or derivatives thereof, and a specific amount of water is added and mixed after performing a hot-melt polycondensation reaction for an aromatic dihydroxy compound and a dicarbonate and while the reaction product polycarbonate is still in a molten state, and accomplished the present invention.

Also, in the interfacial polymerization method, a method consisting of adding water in an amount of 0.2–20 parts by weight for 100 parts by weight of the polycarbonate at the time of kneading of the polycarbonate powder produced, and extruding while degassing is being done so as to reduce volatile impurities such as methylene chloride has been disclosed (Japanese Kokoku Patent No. Hei 5[1993]-27647).

OBJECTIVE OF THE INVENTION

The objective of the present invention is to provide a method for manufacturing a polycarbonate composition that is capable of efficiently producing a polycarbonate composition with superior stability, such as heat stability and color stability at the time of molding and high weather resistance and moisture resistance and transparency.

OUTLINE OF THE INVENTION

The feature of the method for manufacturing a polycarbonate composition of the present invention is:

a hot-melt polycondensation is performed for an aromatic dihydroxy compound and a dicarbonate in the presence of a basic catalyst, then, (B) sulfur-containing acid compound with a pKa value less than 3 or derivative thereof, and (C) 5–1,000 ppm of water for the polycarbonate are added while the polycarbonate reaction product (A) is still in a molten state.

In the present invention, it is desirable to further include additive (D) in the above mentioned sulfur-containing compound or derivative thereof (B) and a specific amount of water (C).

According to the method for manufacturing the polycarbonate composition of the present invention, it is possible to produce a polycarbonate composition with improved heat stability (retention of stability at the time of the hot-melt process) when the above mentioned sulfur-containing compound or derivative thereof (B), specific amount of water (C) and additive (D) are added while the polycarbonate reaction product produced by performing a hot-melt polycondensation reaction is still in a molten state. As a result, the occurrence of a heat history for the polycarbonate composition during the manufacturing process is reduced, and thermal decomposition of the polycarbonate composition can be prevented at the time of posttreatments that follow.

Said polycarbonate composition is less likely to undergo thermal decomposition during the molding process, thus, the transparency and color stability are superior, mechanical properties are also superior, and the moisture resistance and weather resistance are high.

SPECIFIC EXPLANATION OF THE INVENTION

In the following, the method for manufacturing the polycarbonate composition of the present invention is explained in specific terms.

Polycarbonate (A)

In the present invention, first, a hot-melt polycondensation reaction is performed for an aromatic dihydroxy compound and a dicarbonate in the presence of a basic catalyst and polycarbonate (A) is produced.

Said aromatic dihydroxy compound is not especially limited, but the compound shown in general formula (I) below can be mentioned.

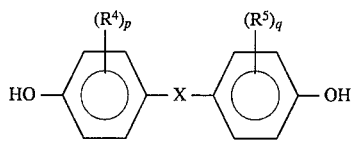

(X represents

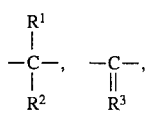

—O—, —S—, —SO—, or —SO$_2$—.

In the formula, $R^1$ and $R^2$ each represent a hydrogen or a monovalent hydrocarbon group, and $R^3$ represents a bivalent hydrocarbon group. Also, $R^4$ and $R^5$ are either a halogen or a monovalent hydrocarbon group; furthermore, these may be the same or different. p and q are integers in the range of 0–4.

For the aromatic dihydroxy compound shown in the formula above, specifically the following can be mentioned:
bis(hydroxyaryl) alkanes such as
bis (4-hydroxyphenyl) methane,
1,1-bis(4-hydroxyphenyl)ethane,
2,2-bis(4-hydroxyphenyl)propane,
2,2-bis(4-hydroxyphenyl)butane,
2,2-bis(4-hydroxyphenyl)octane,
bis(4-hydroxyphenyl)phenylmethane,
2,2-bis(4-hydroxyphenylhydroxy-1-methylphenyl)propane
1,1-bis(4-hydroxyphenylhydroxy-t-butylphenyl)propane, and
2,2-bis(4-hydroxyphenylhydroxy-3-bromophenyl)propane,
bis(hydroxyaryl)cycloalkanes such as
1,1-bis(4-hydroxyphenyl)cyclopentane, and
1,1-bis(4-hydroxyphenyl)cyclohexane,
ethers such as
4,4'-dihydroxy diphenyl ether, and
4,4'-dihydroxy-3,3'-dimethyl phenyl ether,
diarylsulfides such as
4,4'-dihydroxydiphenylsulfide, and
4,4'-dihydroxy-3,3'-dimethyldiphenylsulfide,
dihydroxyarylsulfoxides such as
4,4'-dihydroxydiphenylsulfoxide, and
4,4'-dihydroxy-3,3'-dimethyldiphenylsulfoxide, and
dihydroxydiarylsulfones such as
4,4'-dihydroxydiphenylsulfone, and
4,4'-dihydroxy-3,3'-dimethyldiphenylsulfone, etc.
[0020]

Also, for aromatic dihydroxy compounds, the compound shown in general formula (II) below can be used.

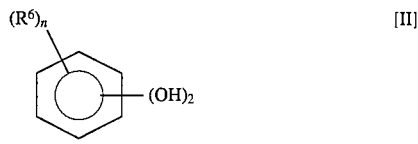

In the formula, n is an integer in the range of 0–4. $R^6$ represents either a hydrocarbon group with 1–10 carbons, or halides thereof, or halogen, and when n is 2–4, the $R^6$ may be the same or different.

For the aromatic dihydroxy compound shown in general formula (II) above, specifically, resorcinol, substituted resorcinols such as 3-methylresorcinol, 3-ethylresorcinol, 3-propylresorcinol, 3-butylresorcinol, 3-t-butylresorcinol, 3-phenylresorcin, 3-cumylresorcinol, 2,3,4,6-tetrafluororesorcinol, and 2,3,4,6-tetrabromresorcinol, catechol, hydroquinone, and substituted hydroquinones such as 3-methylhydroquinone, 3-ethylhydroquinone, 3-propylhydroquinone, 3-butylhydroquinone, 3 -t-butylhydroquinone, 3-phenylhydroquinone, 3-cumylhydroquinone, 2,3,5,6-tetramethylhydroquinone, 2,3,5,6-tetra-t-butylhydroquinone, 2,3,5,6-tetrafluorohydroquinone, and 2,3,5,6-tetrabromhydroquinone can be mentioned.

Furthermore, 2,2,2',2'-tetrahydro-3,3,3',3'-tetramethyl-1,1'-spiro B-[1H-indene]-6,6'-diol can also be used as the aromatic dihydroxy compound in the present invention.

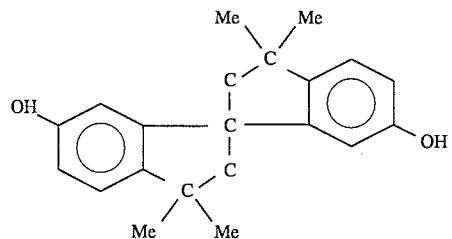

Among those described above, especially, 2,2-bis(4-hydroxyphenyl)propane can be used effectively.

Two or more of these aromatic dihydroxy compounds can be used in combination.

For examples of the dicarbonate, in specific terms,
diphenyl carbonate,
ditolyl carbonate,
bis(chlorophenyl)carbonate,
m-cresyl carbonate,
dinaphthyl carbonate,
bis(diphenyl)carbonate,
diethyl carbonate,
dimethyl carbonate,
dibutyl carbonate,
dicyclohexyl carbonate, etc., can be mentioned.

Among those described above, especially, diphenyl carbonate can be used effectively.

Two or more of these dicarbonates can be used in combination.

Furthermore, a dicarboxylic acid, or dicarboxylate may be further included in the above mentioned dicarbonate in an amount preferably less than 50 mol %, and less than 30 mol % is further desirable.

For the above mentioned dicarboxylic acid or dicarboxylates, aromatic dicarboxylic acids such as terephthalic acid, isophthalic acid, diphenylterephthalate, and diphenylisophthalate, aliphatic dicarboxylates such as succinic acid, glutaric acid, adipic acid, pimelic acid, suberic acid, azelaic acid, sebacic acid, decanoic diacid, dodecanoic diacid, diphenylsebacate, diphenyldecanate, and diphenyldodecanate, and alicyclic dicarboxylates such as cyclopropanedicarboxylate, 1,2-cyclobutanedicarboxylate, 1,3-cyclobutanedicarboxylate, 1,2-cyclopentanedicarboxylate, 1,3-cyclopentanedicarboxylate, 1,2-cyclohexanedicarboxylate, 1,3-cyclohexanedicarboxylate, 1,4-cyclohexanedicarboxylate, diphenylcyclopropanedicarboxylate, diphenyl-1,2-cyclobutanedicarboxylate, diphenyl-1,3-cyclobutanedicarboxylate, diphenyl-1,2-cyclopentanedicarboxylate, diphenyl-1,3-cyclopentanedicarboxylate, diphenyl-1,2-cyclohexanedicarboxylate, diphenyl-1,3-cyclohexanedicarboxylate, and diphenyl-1,4-cyclohexanedicarboxylate can be mentioned.

Two or more of these may be included in the dicarbonate.

Upon performing a hot-melt polycondensation reaction for an aromatic dihydroxy compound and a dicarbonate, in general, the amount of the dicarbonate used is 1.0–1.30 mol for 1 mol of aromatic dihydroxy compound in the present invention, and 1.01– 1.20 mol is further desirable.

Furthermore, it is possible to use a polyfunctional group compound having at least three functional groups in the molecule in combination with the above mentioned aromatic dihydroxy compound and dicarbonate in the present invention in the production of polycarbonate (A).

For said polyfunctional groups compounds, compounds containing a phenolic hydroxy group or carboxyl group, and a compound containing three phenolic hydroxy groups is especially desirable. Specifically, for example, 1,1,1-tris(4-hydroxyphenyl)ethane, 2,2',2"-tris(4-hydroxyphenyl)diisopropylbenzene, α-methyl-α,α' ,α'-tris(4-hydroxyphenyl)-1,4-diethylbenzene, α,α',α"-tris(4-hydroxyphenyl)-1,3,5-triisopropylbenzene, fluoroglycine, 4,6-dimethyl-2,4,6-tri(4-hydroxyphenyl)-heptane-2,1,3, 5-tri -(4-hydroxyphenyl)benzene, 2,2-bis-[4,4-(4,4'-dihydroxyphenyl)-cyclohexyl]-propane, trimellitic acid, 1,3,5-benzenetricarboxylic acid, pyromellitic acid, etc. can be mentioned.

Among those described above, 1,1,1-tris (4-hydroxyphenyl)ethane, α,α',α"-tris(4-hydroxyphenyl)-1,3,5-triisopropylbenzene, etc. can be used effectively.

In general, the amount of the polyfunctional group compound used for 1 mol of the aromatic dihydroxy compound is less than 0.03 mol, preferably, 0.001–0.02 mol, and especially, 0.001– 0.01 mol.

In the present invention, a hot-melt polycondensation reaction is performed for the above mentioned aromatic dihydroxy compound and dicarbonate in the presence of a basic catalyst and a polycarbonate (A) is produced.

It is desirable to use an alkali metal compound and/or alkaline-earth metal compound (a) for said basic catalyst.

For the alkali metal compound and/or alkaline-earth metal compound, specifically, organic acid salts, inorganic acid salts, oxides, hydroxides, hydrides, or alcoholates of alkali metals and alkaline-earth metals can be mentioned as suitable materials.

More precisely, sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium borohydride, lithium borohydride, sodium borophenylide, sodium benzoate, potassium benzoate, lithium benzoate, disodium hydrogenphosphate, dipotassium hydrogenphosphate, dilithium hydrogenphosphate disodium salt, dipotassium salt, dilithium salt of bisphenol A, sodium salt, potassium salt, and lithium salt of phenol, etc., can be mentioned for alkali metal compounds.

Specifically, calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, strontium stearate, etc., can be mentioned for alkaline-earth metal compounds.

Two or more of these compounds may be used in combination.

It is desirable to use $1\times10^{-8}$ to $1\times10^{-3}$ mol, preferably $1\times10^{-7}$ to $2\times10^{-6}$ mol, of the above mentioned alkali metal compounds and/or alkaline-earth metal compounds (a) for 1 mol of the above mentioned aromatic dihydroxy compound.

When an alkali metal compound or alkaline-earth metal compound is used as the catalyst in the amount described above, it is possible to produce polycarbonate at a high polymerization level, and when an acid compound described below is used in an amount that does not have an adverse effect on the polycarbonate produced is added, it is possible to adequately neutralize or decrease the basic properties of the compound.

In the present invention, in addition to the above mentioned alkali metal compound and/or alkaline-earth metal compound (a), a basic compound (b) , and/or a boric acid compound (c) can be used in combination.

For said basic compound (b), for example, nitrogen-containing basic compounds that can be either easily dissolved at a high temperature or which are volatile can be mentioned. Specifically, the compounds indicated below can be mentioned.

Ammonium hydroxides containing an alkyl, aryl, and aralkyl groups such as tetramethyl ammonium hydroxide ($Me_4NOH$), tetraethyl ammonium hydroxide ($Et_4NOH$), tetrabutyl ammonium hydroxide ($Bu_4NOH$), and trimethylbenzyl ammonium hydroxide ($\phi CH_2(ME)_3NOH$), tertiary amines such as trimethylamine, triethylamine, dimethylbenzylamine, triphenylamine, trioctylamine, tridodecylamine, and trioctadecylamine, secondary amines shown in $R_2NH$ (in the formula, R represents an alkyl group such as methyl or ethyl, or aryl group such phenyl and toluyl group), primary amines shown in $RNH_2$ (in the formula, R is the same as above), pyridines such as 4-dimethylaminopyridine, 4-diethylaminopyridine, and 4-pyrolidinopyridine, imidazoles such as 2-methylimidazole, 2-phenylimidazole, and 2-dimethylaminoimidazole, or basic salts such as ammonia, tetramethyl ammonium borohydride ($Me_4NBH_4$), tetrabutyl ammonium borohydride ($Bu_4NBH_4$), tetrabutyl ammonium tetraphenylborate ($Bu_4NBPh_4$), and tetramethyl ammonium tetraphenylborate ($Me_4NBPh_4$), etc., can be mentioned.

Among those described above, tetraalkyl ammonium hydroxides, especially, tetraalkyl ammonium hydroxides suitable for electronics applications having fewer metal impurities can be used effectively.

It is desirable to use $1\times10^{-6}$ to $1\times10^{-1}$ mol, preferably $1\times10^{-5}$ to $2\times10^{-2}$ mol of the nitrogen-containing basic compound (b) for 1 mol of the aromatic dihydroxy compound.

Also, for boric acid compound (c), boric acid or borate, etc., can be mentioned.

For borates, the borate shown in the general formula below can be mentioned.

$$B(OR)_n(OH)_{3-n}$$

In the formula, R represents an alkyl group such as a methyl or ethyl, or aryl group such as phenyl, and n is either 1, 2, or 3.

For said borate, specifically, trimethylborate, triethylborate, tributylborate, trihexylborate, triheptylborate, triphenylborate, tritolylborate, trinaphthylborate, etc., can be mentioned.

It is desirable to use $1\times10^{-8}$ to $1\times10^{-1}$ mol, preferably $1\times10^{-7}$ to $1\times10^{-2}$ mol, and especially $1\times10^{-6}$ to $1\times10^{-4}$ mol, of boric acid, or borate (c) as a catalyst for 1 mol of the aromatic dihydroxy compound.

In the present invention, it is desirable to use (b) a nitrogen-containing basic compound in combination with the above mentioned [compound]

(a) an alkali metal compound and/or an alkaline-earth metal compound, or (b) a nitrogen-containing basic compound and (c) a boric acid or borate in combination with the above mentioned [compound] an alkali metal compound and/or an alkaline-earth metal compound (a) as the basic catalyst.

When a nitrogen-containing basic compound (b) in an amount described above is used in combination with an alkali metal compound and/or alkaline-earth metal compound as the basic catalyst, it is possible to carry out the polycondensation reaction between the aromatic dihydroxy compound and dicarbonate at an adequate polymerization rate, and a polycarbonate with a high molecular weight can be produced at a high polymerization level.

Furthermore, when the above mentioned three components are used in combination as the basic catalyst, it is further desirable since it is possible to produce a polycarbonate that is less likely to undergo a reduction in the molecular weight after the heat aging treatment.

With said catalysts, the polycondensation reaction for the aromatic dihydroxy compound and the dicarbonate can be performed under the same conditions commonly used in the conventional polycondensation reaction.

Specifically, the first stage reaction is performed at a temperature of 80°–250° C., preferably 100°–230° C., and especially 120°–190° C. for 0–5 h, preferably 0–4 h, and especially 0–3 h, at ambient pressure, and reaction of an aromatic dihydroxy compound and a dicarbonate is performed. Then, the pressure of the reaction system is slowly decreased, and the reaction temperature is increased and a reaction of the aromatic dihydroxy compound and dicarbonate is performed, and the final polycondensation reaction is performed for the aromatic dihydroxy compound and dicarbonate under a reduced pressure of less than 5 mm Hg, preferably, less than 1 mm Hg, at 240°–320° C.

The above mentioned polycondensation reaction may be performed using either a continuous method or a batch method. Also, the reaction device used upon performing the above mentioned reaction may be a tank type, a tube type, or a tower type.

In general, the limiting viscosity of the polycarbonate reaction product produced as described above measured in 20° C. methylene chloride is 0.10–1.0 dL/g, and 0.30–0.65 dL/g is further desirable.

As explained above, in the present invention, toxic materials such as phosgene and methylene chloride are not used in production of the polycarbonate and therefore, it is desirable from the environmental point of view.

Production of polycarbonate

In the present invention, a sulfur-containing compound with a pKa value less than 3 or derivatives thereof (B) (referred to as acid compound (B) at times) shown below, and a specific amount of water (C) are added immediately after the polycondensation reaction without cooling the polycarbonate reaction product (A) produced as described above.

Acid component or derivative thereof (B)

The sulfur-containing compound with a pKa value less than 3 or the derivative thereof (B) used in the present invention is explained below.

In the present invention, for the sulfur-containing compound or the derivative thereof (B), sulfurous acids, sulfuric acids, sulfinic acid compounds, sulfonic acid compounds and derivatives thereof can be mentioned. Specifically, for the sulfurous acid derivatives, dimethyl sulfite, diethyl sulfite, dipropyl sulfite, dibutyl sulfite, diphenyl sulfite, etc., can be mentioned.

For sulfuric acid derivatives, dimethyl sulfate, diethyl sulfate, dipropyl sulfate, dibutyl sulfate, diphenyl sulfate, etc., can be mentioned.

For sulfinic acid compounds, benzenesulfinate, toluenesulfinate, naphthalenesulfinate, etc., can be mentioned.

Furthermore, for sulfonic acid compounds and the derivatives thereof, the compound shown in the following general formula (III) and ammonium salts thereof can be mentioned.

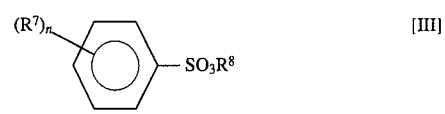

In the formula, $R^7$ represents a hydrocarbon group with 1–50 carbons (the hydrogen may be substituted with a halogen), $R^8$ represents either a hydrogen or a hydrocarbon group with 1–50 carbons (the hydrogen may be substituted with a halogen), and n is an integer in the range of 0–3.

For said sulfonic acid compounds or the derivatives thereof, the compounds shown below can be mentioned.

Sulfonic acids such benzenesulfonate sulfonic acid and p-toluenesulfonic acid, and sulfonates such as methylbenzenesulfonate, ethylbenzenesulfonate, butylbenzenesulfonate, octylbenzenesulfonate, phenylbenzenesulfonate, p-toluenemethylsulfonate, p-tolueneethylsulfonate, p-toluenebutylsulfonate, p-tolueneoctylsulfonate, and p-toluenephenylsulfonate, and sulfonic acid ammonium salts such as p-toluene ammonium sulfonate.

In addition to the sulfonic acid compounds shown in the above mentioned general formula (III), sulfonic acid compounds such as trifluoromethane sulfonic acid, naphthalene sulfonic acid, sulfonated polystyrene, and methylacrylate-sulfonated styrene copolymer can be mentioned.

In the present invention, the sulfonic acid compounds shown in the above mentioned general formula (III), or the derivatives thereof can be used effectively as the sulfur-containing compound (B).

In the above mentioned general formula (III), a sulfonate compound, in which $R^7$ and $R^8$ represents a substituted aliphatic hydrocarbon group with 1–8 carbons, and an n of either 0 or 1 can be used effectively. For said sulfonate compounds, specifically, ethylbenzenesulfonate, butylbenzenesulfonate, methyl-p-toluenesulfonate, ethyl-p-toluenesulfonate, butyl-p-toluenesulfonate, etc., can be mentioned.

Among those described above, methyl-p-toluenesulfonate, ethyl-p-toluenesulfonate, and butyl-p-toluenesulfonate are especially desirable.

Two or more of these compounds may be used in combination.

In the present invention, it is desirable to add 0.1–10 ppm, preferably, 0.1–8 ppm, and especially 0.1–5 ppm of the above mentioned acid compound (B) for polycarbonate (A) produced above.

Also, in the present invention, in addition to the above mentioned acid compound (B), a specific amount of water (C) is added. The amount of (C) added is 5–1,000 ppm, preferably, 10–500 ppm, and especially 20–300 ppm for the polycarbonate (A).

When a specific amount of water (C) is added in combination with the acid compound (B), the neutralization effect of the basic catalyst in the polycarbonate (A) is promoted by the acid compound (B), and a polycarbonate composition with superior stability and high color quality, transparency, moisture resistance and weather resistance can be produced.

It should be noted that when greater than 1,000 ppm of water are added, hydrolysis of the polycarbonate is likely to occur, and the properties of the polycarbonate have a tendency to deteriorate.

In the present invention, the above mentioned acid compound (B) and a specific amount of water (C) are added and kneaded while the polycarbonate reaction product (A) is still in a molten state, and a polycarbonate composition is produced.

In the present invention, the above mentioned acid compound (B) and the specific amount of water (C) are added while the polycarbonate (A) produced by the polycondensation reaction is still in an molten state in the reactor or extruder as explained above. In this case, the acid compound (B) and the specific amount of water (C) may be added separately or at the same time, and the addition order is not restricted, but it is desirable for the components to be added at the same time. Also, in general, the polycarbonate composition is produced in the form of a pellet.

Kneading of the polycarbonate (A), acid compound (B) and specific amount of water (C) is performed by using a standard mixer such as a uniaxial extruder, biaxial extruder, and static mixers, and these mixers may include a vent or may not include a vent.

In order to produce a polycarbonate composition by adding and kneading the acid compound (B) and specific amount of water (C) while the reaction product polycarbonate (A) is still in a molten state, specifically, for example, the acid compound (B) and specific amount of water (C) may be added to the polycarbonate (A) in the reactor used to produce the polycarbonate by performing a polycondensation reaction then, pelletizing the mixture with an extruder, or the acid compound (B) and specific amount of water (C) may be added while the polycarbonate (A) produced by the polycondensation reaction is being transferred from the reactor to the extruder and pelletized and kneaded to produce the polycarbonate composition.

In general, when polycarbonate is used, the polycarbonate pellet is melted and various types of additives such as heat stabilizers are added. In the polycarbonate composition produced by the present invention, the heat stability at the time of the hot-melt process is increased as described above, therefore, the stability is high at the time of the hot-melt process, and the thermal decomposition is well controlled when the pellet made of the above mentioned polycarbonate composition is reheated to make it molten at the time of the addition of various types of additives, during the molding process, and, as a result, the molecular weight is less likely to deteriorate, and discoloring is less likely to occur.

Additives (D)

In the present invention, it is desirable to further include additive (D) in manufacturing the polycarbonate composition in addition to the above mentioned acid compound (B) and specific amount of water (C) in an amount that does not interfere with the objective of the present invention.

Said additive (D) can be added to the polycarbonate (A) in the molten state at the same time when the acid compound (B) and specific amount of water (C) are added, or [it can be added] separately. In the present invention, it is desirable to add the reactive additives among the additive (D) after addition of the acid compound (B) and specific amount of water (C).

For the additive (D) that can be used in the present invention, specifically, a variety of additives commonly added to polycarbonates can be mentioned according to the application purpose, and heat stabilizers, epoxy compounds, ultraviolet absorbers, release agents, colorants, antistatic agents, antislipping agents, antiblocking agents, lubricants, antifogging agents, natural oils, synthetic oils, waxes, organic fillers, and inorganic fillers, etc., can be mentioned.

Among those described above, (i) heat stabilizers, (ii) epoxy compounds, (iii) ultraviolet absorbers, (iv) release agents, and (v) colorants shown below can be used effectively as additive (D). Two or more of these compounds may be used in combination.

Heat stabilizers (i)

For the heat stabilizers (i) that can be used in the present invention, specifically, for example, phosphorous compounds, phenol type stabilizers, organic thioether type stabilizers, hindered amine type stabilizers, etc., can be mentioned.

For the phosphorous compound, phosphoric acid, phosphorous acid, hypophosphorous acid, pyrophosphoric acid, polyphosphoric acid, phosphate, and phosphite, etc., can be used.

For said phosphates, specifically, for example, trialkyl phosphates such as trimethyl phosphate,
triethyl phosphate,
tributyl phosphate,
trioctyl phosphate,
tridecyl phosphate,
trioctadecyl phosphate,
distearylpentaerythrithyl diphosphate,
tris(2-chloroethyl)phosphate, and tris(2,3-dichloropropyl)phosphate,
tricycloalkyl phosphates such as
tricyclohexyl phosphate,
triaryl phosphates such as triphenyl phosphate,
tricresyl phosphate,
tris(nonylphenyl)phosphate, and
2-ethylphenyldiphenyl phosphate, etc., can be mentioned.

Also, for the phosphites, the compound shown in the following general formula can be mentioned.

$P(OR)_3$ (In the formula, R represents either an alicyclic hydrocarbon group, aliphatic hydrocarbon group, or aromatic hydrocarbon group. These may be the same or different.)

For compounds shown in the above mentioned formula, for example,
trialkyl phosphites such as
trimethyl phosphite,
triethyl phosphite,
tributyl phosphite,
trioctyl phosphite,
tris(2-ethylhexyl)phosphite,
trinonyl phosphite,
tridecyl phosphite,
tristearyl phosphite, and
tris(2-chloroethyl)phosphite,
tricycloalkyl phosphites such as
tris(2,3-dichloropropyl)phosphite,
triaryl phosphites such as
triphenyl phosphite,
tricresyl phosphite,
tris(ethylphenyl) phosphite,
tris(2,4-di-t-butylphenyl) phosphite,
tris(nonylphenyl) phosphite, and
tris(hydroxyphenyl) phosphite, and
arylalkyl phosphites such as
phenyldidecyl phosphite,
diphenyldecyl phosphite,
diphenylisooctyl phosphite,
phenylisooctyl phosphite, and
2-ethylhexyldiphenyl phosphite, can be mentioned.
Furthermore, for phosphites,
distearylpentaerythrithyl diphosphite,
bis(2,4-t-butylphenyl) pentaerythrithyl diphosphite, etc., can be mentioned.

Among those described above, phosphites shown in the above mentioned general formula are suitable for phosphorous compounds, and aromatic phosphites are further desirable. Tris(2,4-di-t-butylphenyl) phosphite is especially desirable.

For phenol type stabilizers, for example, n-octadecyl-3-(4-hydroxy-3',5'-di-t-butylphenyl)propionate, tetrakis(methylene-3 -(3',5'-di-t-butyl-4-hydroxyphenyl)propionate) methane, 1,1,3-tris (2-methyl-4-hydroxy-5-t-butylphenyl)butane, distearyl (4-hydroxy-3-methyl-5-t-butyl)benzylmalonate, 4-hydroxymethyl -2,6-di-t-butylphenol, etc., can be mentioned.

For thioether type stabilizers, for example, dilaurylthiodipropionate, distearylthiodipropionate, dimyristyl -3,3'-thiodipropionate, ditridecyl-3,3'-thiodipropionate, pentaerythritoltetrakis(β-lauryl-thiopropionate), etc., can be mentioned.

Also, for hindered amine type stabilizers, for example, bis(2,2,6,6-tetramethyl-4-piperidyl)sebacate, bis(1,2,2,6,6-pentamethyl-4-piperidyl ) sebacate, 1-(2-(3-(3,5-di-t-butyl-4-hydroxyphenyl) propionyloxy)ethyl)-4-(3-(3,5-di-t-butyl-4-hydroxyphenyl) propionyloxy) -2,2,6,6-tetramethylpiperidine, 8 -benzyl-7,7,9,9-tetramethyl-3-octyl-1,2,3-triazaspiro [4,5]undecane-2,4-dione, 4-benzoyloxy-2,2,6,6-tetramethylpiperidine, 2-(3,5-di-t-butyl-4-hydroxybenzyl) -2, n-butylbis (1,2,2,6,6-pentamethyl-4-piperidyl) malonate, tetrakis(2,2,6,6-tetramethyl-4-piperidyl)1,2,3,4-butanetetracarboxylate, etc., can be mentioned.

Two or more of these heat stabilizers may be used in combination.

In the present invention, it is desirable to use 0.001–5 parts by weight of the heat stabilizer (i) for 100 parts by weight of the polycarbonate (A), and 0.005–0.5 part by weight is further desirable, and an amount of 0.01–0.3 part by weight is especially desirable.

Furthermore, the heat stabilizer (i) may be used either in a form of a solid material, or a liquid material.

It is desirable to add the heat stabilizer (i) when the polycarbonate (A) is still in a molten state between the end of the final polymerization process and pelletization while being cooled.

Epoxy compounds (ii)

In the present invention, as the epoxy compound (ii), a compound containing at least one epoxy group in the molecule is used. Specifically,
epoxidized soybean oil,
epoxidized linseed oil,
phenyl glycidyl ether,
allyl glycidyl ether,
t-butyl phenyl glycidyl ether,
3,4-epoxycyclohexylmethyl-3',4'-epoxycyclohexylcarboxylate,
3,4-epoxy-6-methylcyclohexylmethyl-3',4'-epoxy -6'-methylcyclohexylcarboxylate,
2,3-epoxycyclohexylmethyl-3',4'-epoxycyclohexylcarboxylate,
4-(3,4-epoxy-5-methylcyclohexyl)butyl-3',4' -epoxycyclohexylcarboxylate,
3,4-epoxycyclohexylethylene oxide,
cyclohexylmethyl-3,4-epoxycyclohexylcarboxylate,
3,4-epoxy-6-methylcyclohexylmethyl-6'-methylcyclohexylcarboxylate,
bisphenol-A diglycidyl ether,
tetrabromobisphenol-A glycidyl ether,
diglycidyl ester of phthalic acid,
diglycidyl ester of hexahydrophthalic acid,
bis-epoxydicyclopentadienyl ether, bis-epoxyethylene glycol,
bis-epoxycyclohexyl adipate,
butadiene diepoxide,
tetraphenylethylene epoxide,
octyl epoxyate [transliteration],
epoxidized polybutadiene,
3,4-dimethyl-1,2-epoxycyclohexane,
3,5-dimethyl-1,2-epoxycyclohexane,
3-methyl-5-t-butyl-1,2-epoxycyclohexane,
octadecyl-2,2-dimethyl-3,4-epoxycyclohexylcarboxylate, N-butyl-2,2-dimethyl-3,4-epoxycyclohexylcarboxylate, cyclohexyl-2-methyl-3,4-epoxycyclohexylcarboxylate, N-butyl-2-isopropyl-3,4-epoxy-5-methylcyclohexylcarboxylate, octadecyl-3,4-epoxycyclohexylcarboxylate,2-ethylhexyl-3',4' -epoxycyclohexylcarboxylate, 4,6-dimethyl-2,3-epoxycyclohexyl-3',4' -epoxycyclohexylcarboxylate, 4,5-epoxytetrahydrophthalic acid anhydride, 3-t-butyl-4,5-epoxytetrahydrophthalic acid anhydride, diethyl-4,5-epoxy-cis-1,2-cyclohexyldicarboxylate, di-n-butyl-3-t-butyl-4,5-epoxy-cis-1,2 -cyclohexyldicarboxylate, etc., can be mentioned.

Among those described above, alicyclic epoxy compounds can be used effectively, and 3,4-epoxycyclohexylmethyl-3',4'-epoxycyclohexylcarboxylate is especially desirable.

Two or more of these described above can be used in combination.

In the present invention, an amount of 1–2,000 ppm of the epoxy compound (ii) is added for the polycarbonate (A), and an amount of 10–1,000 ppm is further desirable.

Especially when the epoxy compound (ii) is used as the additive (D), it is desirable to add the epoxy compound (ii) after adding the acid compound (B) and specific amount of water (C) so as to neutralize an excess amount of the acid compound (B) added. When the acid compound (B) that may exist in the polycarbonate composition at times is neutralized with the epoxy compound (ii), it is possible to produce a polycarbonate composition with a high moisture resistance and transparency.

Ultraviolet absorbers (iii)

For the ultraviolet absorbers (iii), standard ultraviolet absorbers commonly used can be used in this case, and it is not especially limited, and salicylic acid type ultraviolet absorbers, benzophenone type ultraviolet absorbers, benzotriazole type ultraviolet absorbers, cyanoacrylate type ultraviolet absorber, etc., can be mentioned as examples.

For salicylic acid type ultraviolet absorbers, specifically, phenylsalicylate, p-t-butylphenylsalicylate, etc., can be mentioned as examples.

For benzophenone type ultraviolet absorbers, 2,4-dihydroxybenzophenone, 2-hydroxy-4-methoxybenzophenone, 2,2' -dihydroxy-4-methoxybenzophenone, 2,2'-dihydroxy-4, 4'-dimethoxybenzophenone, 2-hydroxy-4-methoxy-2'-carboxybenzophenone, 2-hydroxy-4-methoxy-5-sulfobenzophenonetrihydrate, 2-hydroxy-4-n-octoxybenzophenone, 2,2',4,4'-tetrahydroxybenzophenone, 4-dodecyloxy-2-hydroxybenzophenone, bis(5-benzoyl-4-hydroxy-2-methoxyphenyl)methane, 2-hydroxy-4 -methoxybenzophenone-5-sulfonic acid, etc., can be mentioned.

For benzotriazole type ultraviolet absorbers, for example, 2-(2'-hydroxy-5'-methylphenyl)benzotriazole, 2-(2'-hydroxy-3',5' -di-t-butylphenyl)benzotriazole, 2-(2'-hydroxy-3'-t-butyl-5' -methylphenyl)-5-chlorobenzotriazole, 2-(2'-hydroxy-3',5' -di-t-butylphenyl)-5-chlorobenzoriazole, 2-(2'-hydroxy-5'-t-octylphenyl)benzotriazole, 2-(2'-hydroxy-3',5'-di-t-amylphenyl)benzotriazole, 2-(2'-hydroxy-3'-(3",4",5",6" -tetrahydrophthalimidemethyl)-5'-methylphenyl)benzotriazole, 2,2'-methylene bis(4-(1,1,3,3-tetramethylbutyl)-6-(2H-benzotriazole-2 -yl)phenol), etc., can be mentioned.

For cyanoacrylate type ultraviolet absorbers, 2-ethylhexyl -2-cyano-3,3'-diphenyl acrylate, ethyl-2-cyano-3,3-diphenyl acrylate, etc., can be mentioned.

Two or more of those described above can be used in combination.

In the present invention, it is desirable to use 0.001–5 parts by weight of the ultraviolet absorbers (iii) for 100 parts by weight of the polycarbonate (A), and 0.005–1.0 part by weight is further desirable, and an amount of 0.01–0.5 part by weight is especially desirable.

Release agents (iv)

For the release agent (iv), standard release agents may be used in this case, and it is not especially limited.

For example, for hydrocarbon type release agents, natural and synthetic paraffins, polyethylene waxes, fluorocarbons, etc., can be mentioned.

For aliphatic type release agents, higher fatty acids such as stearic acid, hydroxystearic acid, and oxy fatty acids, etc., can be mentioned.

For fatty acid amide type release agents, fatty acid amides such as stearic acid amide, ethylenebisstearoamide, and alkylene bisfatty acid amide, etc., can be mentioned.

For alcohol type release agents, aliphatic alcohols such as stearyl alcohol, and cetyl alcohol, polyhydric alcohols, polyglycols, polyglycerols, etc., can be mentioned.

For fatty acid ester type release agents, fatty acid lower alcohol esters such as butylstearate, and pentaerythritol tetrastearate, fatty acid polyhydric alcohol esters, fatty acid polyglycol esters, etc., can be mentioned.

For silicone type release agents, silicone oils, etc., can be mentioned.

Two or more of those described above may be used in combination.

In the present invention, it is desirable to use 0.001–5 parts by weight of the release agent (iv) for 100 parts by weight of the polycarbonate (A), and 0.005–1 part by weight is further desirable, and an amount of 0.01–0.5 part by weight is especially desirable.

Colorants (v)

For the colorants, either pigments or dyes may be used. For the colorants, organic type and inorganic type colorants are available, and in this case, either one may be used, and further, they may be used in combination.

For inorganic type colorants, specifically, oxides such as titanium dioxide, and red iron oxide, hydroxides such as alumina white, sulfide such as zinc sulfide, ferrocyanates such as selenides, and iron blue, chromates such as zinc chromate, and molybdate red, sulfates such as barium sulfate, carbonates such as calcium carbonate, silicates such as ultramarine, phosphates such as manganese violet, carbons such as carbon black, metal powder colorants such as bronze powder, and aluminum powder can be mentioned.

For organic type colorants, specifically, nitroso type such as naphthol green B, nitro type such as naphthol yellow S, azo type such as lithol red, Bordeaux 10B, naphthol red, and chromophthal yellow, phthalocyanine type such as phthalocyanine blue, and fast sky blue, polycyclic condensate colorants such as indantron [transliteration] blue, quinacridone violet, and dioxadine violet, etc., can be mentioned.

Two or more of these described above can be used in combination.

In the present invention, it is desirable to use $1\times10^{-6}$ to 5 parts by weight of the colorants (v) for 100 parts by weight of the polycarbonate (A), and $1\times10^{-5}$ to 3 parts by weight are further desirable, and an amount of $1\times10^{-5}$ to 1 part by weight is especially desirable.

In the present invention, it is desirable to use the epoxy compound (ii) for the above mentioned additive (D), and as described above, it is desirable to add the epoxy compound (ii) after adding the acid compound (B) and specific amount of water (C) so as to neutralize the excess amount of the acid compound (B).

Also, in the present invention, upon adding the above mentioned acid compound (B), specific amount of water (C) and additive (D) to the reaction product polycarbonate (A), it is possible to dilute these materials with a polycarbonate powder, or polycarbonate master pellet that includes components (B) and (D) at a high concentration ahead of time, and said master pellet may be added to produce a polycarbonate composition containing components (B) and (D) at a target concentration level. Especially when said polycarbonate powder or the master pellet is used, it is accompanied by a certain level of moisture, therefore, water that meets the target amount is added to provide a specific amount of water (C).

Effect of the invention

According to the present invention, it is possible to accurately and efficiently produce a polycarbonate composition with a superior stability such as heat stability and color stability at the time of hot-melt process.

The polycarbonate composition produced by the present invention is less likely to undergo thermal decomposition at the time of molding process, and the molecular weight is less likely to decrease; furthermore, yellowing is less likely to occur, and the color stability is high.

Furthermore, according .to the present invention, the basic catalyst in the polycarbonate is neutralized and stabilized; therefore, when different types of additives are added, the basic properties of the additives are not lost, and a polycarbonate composition with a high heat resistance, weather resistance, and moisture resistance can be produced.

The polycarbonate composition produced by the method of the present invention can be used effectively as standard molding material, as well as construction materials such as sheets, head lamp lens for automobiles, optical lenses such as eyeglasses, and optical recording materials.

In the following, the present invention is further explained with application examples, but the present invention is not limited to these application examples.

Application examples

In the specification of the present invention, the limiting viscosity [η], MFR, hue (YI), light permeability, haze, retention stability, and moisture resistance of the polycarbonate composition are measured by the methods explained below.

Limiting viscosity [η]

Measurement was performed at 20° C. in methylene chloride by Ubbelohde viscometer.

MFR

Based on the method specified in JIS K-7210, measurement was performed at a temperature of 300° C., and a weight of 1.2 kg.

Hue

An injection molded sheet with a thickness of 3 mm was molded at a cylinder temperature of 290° C., injection pressure of 1000 kg/cm, 1 cycle of 45 sec, and a die temperature of 100° C., and measurement was performed for the X, Y, and Z values by the transmission method using Colorand Color Difference Meter ND-1001 DP produced by the Nippon Denshoku Ind. (Ltd.) and the degree of yellowing (YI) was measured. [0120]

$YI=100(1.277X-1.060Z)/Y$

Light permeability

Based on the method specified in ASTM D 1003, measurement was performed by using the injection molded sheet used for the color measurement.

Haze

NDH-200 produced by Nippon Denshoku Ind. (Ltd.) was used, and the haze of the injection molded sheet used for the color measurement.

Retention stability

The resin was retained in the cylinder of the injection molding machine at 320° C. for 15 min; then, an injection molding was performed at the same temperature, and the MFR, hue (YI), and light permeability of the molded sheet were measured.

Moisture resistance

The injection molded sheet used for the color measurement was placed in water inside an autoclave, and stored at 125° C. in an oven for 5 days. The haze of the sample piece was measured.

Weather resistance

The injection molded sheet used for the color measurement was stored inside the Sunshine Weatherometer (product of Suga Testing Machines, Ltd.: 63° C., carbon arc light source, 18 min rain in 2 h) for 1,000 h, and the hue (YI), and the light transmissivity were measured.

Application Example 1

0.44 kmol of bisphenol A(2,2-bis(4-hydroxyphenyl)propane) (product of Japan G. E. Plastics (Ltd.)), and 0.46 kmol of diphenylcarbonate (product of Eni [transliteration] Co.) were charged in a 250 L stirring tank, substitution with nitrogen was performed, and dissolved at 140° C.

The temperature was then increased to 180° C., 0.11 mol of sodium hydroxide, and 0.00044 mol ($1\times10^{-6}$ mol/mol—bisphenol A) were added as catalysts and stirring was performed for 30 min.

Then, the pressure was slowly reduced to 200 mm Hg as the temperature was increased to 210° C. and the temperature was gradually increased to 240° C. in 30 min, and the pressure was reduced to 15 mm Hg, the temperature and pressure were maintained constant, and the amount of phenol distillate was measured, the pressure was then returned to atmospheric pressure when the distillation of phenol was completed. The time required for the reaction was 1 h. The limiting viscosity [η] of the reaction product was 0.15 dL/g.

Subsequently, the pressure against the reaction product produced was increased by a gear pump, and it was force fed into a centrifugal type thin film evaporator, and the reaction was promoted. The temperature and the pressure of said thin film evaporator was controlled at 270° C. and 2 mm Hg, respectively. [The reaction product] was then supplied to the biaxial horizontal polymerization reactor (L/D=3, diameter of rotating stirring blade of 220 mm, inside capacity of 80 L) controlled at 290° C., and 0.2 mm Hg by the gear pump located at the lower part of the evaporator at a rate of 40 kg/h and polymerization was performed at a retention time of 30 min.

Then, the reaction product produced was transferred to a biaxial extruder (L/D=17.5, barrel temperature of 285° C.) in a molten state by a gear pump, 1.8 ppm of p-toluenebutylsulfonate, and 50 ppm of distilled water were added for the reaction product (polycarbonate), formed into a strand through a die, and cut with a cutter to produce a pellet.

The limiting viscosity [η] of the polycarbonate composition produced was 0.49 dL/g.

The results are shown in Table I.

Application Examples 2 and 3

The types and amount of the acid compound and distilled water used in Application Example 1 were changed to those shown in Table I, and pellets were produced as in Application Example 1.

The results are shown in Table I.

Comparative Example 1

Distilled water was not used as it was in Application Example 1 and a pellet was produced as in Application Example 1.

The results are shown in Table I.

Comparative Example 2

The amount of the distilled water used in Application Example 1 was changed as shown in Table I, and a pellet was produced as in Application Example 1.

The results are shown in Table I.

Comparative Example 3 p-Toluenebutylsulfonate and distilled water were not added as in Application Example 1, and the reaction product was directly extracted from the biaxial horizontal polymerization tank as a strand and cut with a cutter to form a pellet.

1.8 ppm of p-toluenebutylsulfonate and 50 ppm of distilled water were added for the pellet produced, and kneading was performed by a biaxial extruder similar to the one described in Application Example 1 at 285° C. and a pellet was produced.

The results are shown in Table I.

Application Example 4

In addition to the 1.8 ppm of p-toluene butylsulfonate, and 50 ppm of distilled water in Application Example 1, 500 ppm of tris(2,4-di-t-butylphenyl)phosphite (Mark [transliteration] 2112: product of Adekaa [transliteration] Gas Co.), 500 ppm of n-octadecyl-3-(4-hydroxy-3,5-di-t-butylphenyl)propionate (Mark A050: product of Adekaa Gas Co.), 500 ppm of 3,4-epoxycyclohexylmethyl-3',4'-epoxycyclohexylcarboxylate (Celoxide [transliteration] 2021P: product of Daicel Chemical Co.), 3000 ppm of 2-(2'-hydroxy-5'-t-octylphenyl)benzotriazole (Cyasolve [transliteration] UV5411: product of Sun Chemical Co.), 3,000 ppm of silicone release agent (TSF437: product of Toshiba Silicone Co.), and 0.5 ppm of colorant (Plast Violet 8840: product of Beyef Co.) were added and kneaded, and a pellet was produced as in Application Example 1.

The results are shown in Table I.

Application Example 5

Instead of the p-toluenebutylsulfonate in Application Example 4, 1.6 ppm of p-tolueneethylsulfonate were used, and a pellet was produced as in Application Example 4.

The results are shown in Table I.

Comparative Example 4

Distilled water was not added as it was in Application Example 4, and a pellet was produced as in Application Example 4.

The results are shown in Table I.

Application Example 6

3,4-Epoxycyclohexylmethyl-3',4'-epoxycyclohexylcarboxylate and a silicone release agent were added as in Application Example 4, from the supply port located at the lower stream of the extruder after adding p-toluenebutylsulfonate, 50 ppm of distilled water, tris(2,4-di-t-butylphenyl)phosphite, n-octadecyl-3-(4-hydroxy-3,5-di-t-butylphenyl)propionate, 2-(2'-hydroxy-5'-t-octylphenyl)benzotriazole, and a colorant was added and kneading was performed, and a pellet was produced as in Application Example 4

The results are shown in Table I.

TABLE I

| Addition Method | Application Example 1 After Polymerization | Application Example 2 After Polymerization | Application Example 3 After Polymerization | Comparative Example 1 After Polymerization | Comparative Example 2 After Polymerization | Comparative Example 3 Mixed with Pellet |
|---|---|---|---|---|---|---|
| Amount of Acid Component (ppm) | p-toluenebutyl-sulfonate 1.8 | p-toluenebutyl-sulfonate 1.8 | p-toluenemethyl-sulfonate 1.5 | p-toluenebutyl-sulfonate 1.8 | p-toluenebutyl-sulfonate 1.8 | p-toluenebutyl-sulfonate 1.8 |
| Amount of Water ppm | 50 | 200 | 500 | — | 3000 | 50 |
| Additives | — | — | — | — | — | — |
| Initial Properties | | | | | | |
| Limiting | 0.49 | 0.49 | 0.49 | 0.49 | 0.47 | 0.49 |

TABLE I-continued

| | | | | | | |
|---|---|---|---|---|---|---|
| viscosity (n)(dL/g) | | | | | | |
| MFR (g/10 min; 300° C., 1.2 kg weight) | 10.3 | 10.4 | 10.6 | 10.3 | 11.3 | 10.7 |
| Hue (YI) | 1.3 | 1.3 | 1.4 | 1.5 | 1.7 | 1.9 |
| Light Permeability (%) | 90.8 | 90.8 | 90.7 | 90.8 | 90.7 | 90.7 |
| Haze | 0.2 | 0.2 | 0.2 | 0.2 | 0.3 | 0.3 |
| Retention Stability | | | | | | |
| MFR (g/10 min; 300° C., 1.2 kg weight) | 10.5 | 10.6 | 10.9 | 10.9 | 13.4 | 12.1 |
| MFR Increase Rate (%) | 2 | 2 | 3 | 6 | 18 | 13 |
| Hue (YI) | 1.4 | 1.4 | 1.5 | 1.6 | 2.0 | 2.2 |
| Moisture Resistance | | | | | | |
| Haze | 1.0 | 1.0 | 2.0 | 2.4 | 15.0 | 9.4 |
| Weather resistance | | | | | | |
| Hue (YI) | — | — | — | — | — | — |
| Light Permeability (%) | — | — | — | — | — | — |

| Addition Method | | Application Example 4 After Polymerization | Application Example 5 After Polymerzation | Comparative Example 4 After Polymerization | Application Example 6 After Polymerization |
|---|---|---|---|---|---|
| Amount of Acid Component (ppm) | | p-toluenebutyl-sulfonate 1.8 | p-tolueneethyll-sulfonate 1.8 | p-toluenebutyl-sulfonate 1.8 | p-toluenebutyl-sulfonate 1.8 |
| Amount of Water ppm | | 50 | 50 | — | 50 |
| Additives | | | | | |
| Phosphorus Compound (Mark 2112: Adekaa Gas) | Amount (ppm) | 500 | 500 | 500 | 500 |
| Phenol type stability (Mark AD-50 Adekaa Gas) | Amount (ppm) | 500 | 500 | 500 | 500 |
| Epoxy Compound (Celoxide 2021P: Daicel Chemicals) | Amount (ppm) | 500 | 500 | 500 | 500* |
| Ultraviolet absorbers (Cyasolve UV5411: Sun Chemicals) | Amount (ppm) | 3000 | 3000 | 3000 | 3000 |
| Release agent (Hi-tec [transliteration] 164: Ethyl Petroleum Additives) | Amount (ppm) | 3000 | 3000 | 3000 | 3000* |
| Colorant (Plast Violet 8840: Beyef) | Amount (ppm) | 0.5 | 0.5 | 0.5 | 0.5 |
| Initial Properties | Limiting viscosity (n) | 0.49 | 0.49 | 0.49 | 0.49 |
| | MFR (g/10 min; 300° C., 1-2 kg weight) | 10.7 | 10.6 | 10.7 | 10.7 |
| | Hue (YI) | 0.3 | 0.3 | 0.7 | 0.3 |
| | Light permeability (%) | 90.0 | 90.0 | 89.9 | 90.0 |
| | Haze | 0.3 | 0.3 | 0.3 | 0.3 |
| Retention Stability | MFR (g/10 min; 300° C., 1-2 kg weight) | 10.9 | 10.8 | 11.1 | 10.8 |
| | MFR increase rate | 2 | 2 | 4 | 1 |
| | Light permeability (%) | 0.9 | 0.9 | 1.1 | 0.8 |
| Moisture Resistance | Haze | 1.7 | 1.5 | 3.3 | 1.4 |
| Weather resistance | Hue (YI) | 7.2 | 7.1 | 13.5 | 5.2 |
| | Light permeability (%) | 88.2 | 88.3 | 87.2 | 88.5 |

*In Application Example 6, the epoxy compound and the release agent were added at the latter polymerization stage.

We claim:

1. A method for manufacturing a polycarbonate composition comprising performing a hot-melt polycondensation of an aromatic dihydroxy compound and a dicarbonate in the presence of a basic catalyst, adding (B) 0.1–10 ppm of a sulfur-containing acid compound with a pKa value less than 3 or a derivative thereof, and (C) 5–1,000 ppm of water for the polycarbonate while the reaction product polycarbonate (A) is still in a molten state, and kneading the material.

2. A method for manufacturing a polycarbonate composition comprising performing a hot-melt polycondensation of an aromatic dihydroxy compound and a dicarbonate in the presence of a basic catalyst, adding (B) 0.1–10 ppm of a sulfur-containing component acid with a pKa value less than 3 or a derivative thereof, (C) 5–1000 ppm of water for the polycarbonate, and (D) additives while the reaction product polycarbonate (A) is still in a molten state, and kneading the material.

3. The method for manufacturing a polycarbonate composition described in claim 1 in which the basic catalyst includes $1 \times 10^{-8}$ to $1 \times 10^{-3}$ mol of (a) an alkali metal compound and/or alkaline-earth metal compound for 1 mol of aromatic dihydroxy compound.

4. The method for manufacturing the polycarbonate composition described in claim 3 in which the amount of alkali metal compound and/or alkaline-earth metal compound (a) is $1\times10^{-7}$ to $2\times10^{-6}$ mol for 1 mol of the aromatic dihydroxy compound.

5. The method for manufacturing the polycarbonate composition described in claim 1 in which the sulfur-containing compound with a pKa value less than 3 or derivative thereof (B) is used in an amount of 0.1–5 ppm for the reaction product polycarbonate (A).

6. The method for manufacturing the polycarbonate composition described in claim 1 in which the sulfur-containing compound with a pKa value less than 3 or derivative thereof (B) is the compound shown in general formula (III)

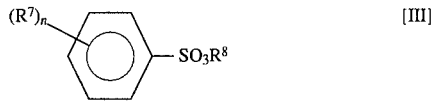

wherein $R^7$ represents a hydrocarbon group with 1–50 carbons or a halogen-substituted hydrocarbon group of 1–50 carbons, $R^8$ represents a hydrogen, a hydrocarbon with 1–50 carbons or a halogen substituted hydrocarbon of 1–50 carbons and n is an integer of from 0 to 3.

7. The method for manufacturing the polycarbonate composition described in claim 6 in which $R^8$ represents a hydrocarbon with 1–8 carbons or a halogen-substituted hydrocarbon with 1–8 carbons.

8. The method for manufacturing the polycarbonate composition described in claim 2 in which the additives (n) are selected from the group consisting of heat stabilizers, epoxy compound ultraviolet absorbers, release agents, and colorants.

9. The method for manufacturing the polycarbonate composition described in claim 2 in which the additive (D) is an epoxy compound, and said epoxy compound is added to the polycarbonate reaction product (A) after adding the sulfur-containing compound with a pKa value less than 3 or derivatives thereof (B) and water (C).

* * * * *